(12) United States Patent
Blake et al.

(10) Patent No.: US 12,367,645 B2
(45) Date of Patent: Jul. 22, 2025

(54) MESH GENERATION

(71) Applicants: SIEMENS INDUSTRY SOFTWARE INC., Plano, TX (US); SIEMENS INDUSTRY SOFTWARE SRL, Milan (IT)

(72) Inventors: Kenneth Blake, Austin, TX (US); Scott Canann, Austin, TX (US); Stefano Pippa, Bologna (IT)

(73) Assignees: SIEMENS INDUSTRY SOFTWARE INC., Plano, TX (US); SIEMENS INDUSTRY SOFTWARE S.r.l., Milan (IT)

( * ) Notice: Subject to any disclaimer, the term of this patent is extended or adjusted under 35 U.S.C. 154(b) by 178 days.

(21) Appl. No.: 18/023,827

(22) PCT Filed: Aug. 31, 2020

(86) PCT No.: PCT/US2020/048723
§ 371 (c)(1),
(2) Date: Feb. 28, 2023

(87) PCT Pub. No.: WO2022/046101
PCT Pub. Date: Mar. 3, 2022

(65) Prior Publication Data
US 2023/0316654 A1 Oct. 5, 2023

(51) Int. Cl.
*G06T 15/00* (2011.01)
*G06T 7/62* (2017.01)
(Continued)

(52) U.S. Cl.
CPC ............. *G06T 17/205* (2013.01); *G06T 7/62* (2017.01); *G06T 7/75* (2017.01); *G06T 2210/21* (2013.01)

(58) Field of Classification Search
CPC .......... G06T 17/205; G06T 7/75; G06T 7/62; G06T 2210/21
(Continued)

(56) References Cited

U.S. PATENT DOCUMENTS 6,879,324 B1 * 4/2005 Hoppe .................. G06T 17/205
345/428
10,210,657 B2 * 2/2019 Sheffer ................. G06T 17/205
(Continued)

OTHER PUBLICATIONS

Georgiadis C, Reberol M, Remacle JF. Indirect all-quadrilateral meshing based on bipartite topological labeling. Engineering with Computers. Oct. 2022;38(5):4731-47.*
(Continued)

*Primary Examiner* — Phu K Nguyen
(74) *Attorney, Agent, or Firm* — Lempia Summerfield Katz LLC

(57) ABSTRACT

A computer implemented method of remeshing patches in a triangular meshed surface that employs an advancing front process is disclosed. An initial surface includes a triangular surface mesh, and a target size field that specifies an optimal triangle edge length at each position on the triangular surface mesh is defined over every point in. The triangular surface mesh is partitioned into patches, where each patch includes a contiguous set of adjacent faces delimited by closed loops of boundary or feature edges and has principal surface curvatures. The method employs an asterisk field generated from a cross field calculated for the patch in order to generate a remeshed surface.

17 Claims, 3 Drawing Sheets

(51) Int. Cl.
  *G06T 7/73* (2017.01)
  *G06T 17/20* (2006.01)

(58) Field of Classification Search
  USPC .......................................................... 345/418
  See application file for complete search history.

(56) References Cited

U.S. PATENT DOCUMENTS

| 10,706,613 | B2* | 7/2020 | Ye | G06T 15/40 |
|---|---|---|---|---|
| 11,016,470 | B2* | 5/2021 | Marinov | B29C 64/393 |
| 2018/0130255 | A1* | 5/2018 | Hazeghi | H04N 23/12 |
| 2022/0382930 | A1* | 12/2022 | Brifault | G06F 30/17 |
| 2023/0042578 | A1* | 2/2023 | Halili | G06T 17/005 |

OTHER PUBLICATIONS

Zint D, Grosso R. Discrete Mesh Optimization on GPU. 27th International Meshing Roundtable. Jul. 1, 2019;127:445.*

Beaufort, Pierre-Alexandre, et al. "Computing cross fields A PDE approach based on the Ginzburg-Landau theory." Procedia engineering 203 (2017): 219-231.

Georgiadis, Christos, et al. "High quality mesh generation using cross and asterisk fields: application on coastal domains." arXiv preprint a href="arXiv:1706.02236" target="_blank" arXiv:1706.02236/a (2017). pp. 1-54.

International Search Report and Written Opinion for International App. PCT/US2020/048723 mailed Jun. 1, 2021.

Knöppel, Felix, et al. "Globally optimal direction fields." ACM Transactions on Graphics (ToG) 32.4 (2013): 1-10.

Marcum, David, and Frederic Alauzet. "Aligned metric-based anisotropic solution adaptive mesh generation." Procedia Engineering 82 (2014): 428-444.

* cited by examiner

MESH GENERATION

This application is the National Stage of International Application No. PCT/US2020/048723, filed Aug. 31, 2020. The entire contents of this document are hereby incorporated herein by reference.

BACKGROUND

The present embodiments is related to a computer implemented method of remeshing patches in a triangular meshed surface and, more specifically, a method that results in creating a remeshed surface.

Computer-Aided Engineering (CAE) is used increasingly in manufacturing operations to aid in the creation, modification, or optimization of a design. This is a critical step in product design, and CAE offers the opportunity to analyze the design at all stages of the Product Lifecycle Management (PLM). CAE software almost always requires mesh generation software, where this is used as part of finite element analysis or computational fluid dynamics as required by the design. Mesh generation (also known as grid generation, meshing, or gridding) takes input from various types of models, including solid modelling (e.g., parametric or direct), geometric modelling, non-uniform rational basis spline (NURBS), boundary representation (B-rep), a stereolithography file format (STL), or a point cloud. The mesh is, in its basic form, a subdivision of a continuous geometric space into discrete geometric and topological cells, creating a discrete local approximation of a larger domain.

A mesh is typically formed from simple cells such as triangles or quadrilaterals, with many algorithms provided over the last few decades for surface meshing and remeshing. However, few of these algorithms are designed to align triangles to both surface curvature and boundaries, thereby minimizing the deviation from the original surface being modelled. There may also be issues with the uniformity of the triangles within the mesh, and lack of conformity with the original imposed variable target size of the surface. One solution proposed to alleviate some of these issues is the use of an advancing front approach for generating triangular surface meshes, such as that discussed in "High Quality Mesh Generation Using cross and Asterisk Fields: Application on Coastal Domains", Georgiadis et al, 26th International Meshing Roundtable, https://imr.sandia.gov/papers/imr26/2007_imr26RN_Georgiadis.pdf. This paper proposes the use of direction fields and a frontal point insertion strategy. Asterisk fields are used to generate triangulations, and cross fields are used to generate right-angled triangulations optimal for transformation into quadrilateral meshes. However, this paper only considers spherical surfaces, where curvature is equivalent in all directions. While vertices are defined, no information is given on the generation of the triangles in the mesh subsequent to the positioning of an apex. Consequently, while this method offers a solution for the spherical surfaces illustrated, there are many situations where non-uniform surfaces are to be modelled and meshes are to be generated accurately and with high quality to enable this, such as in finite element analysis (FEA) and finite volume analysis (FVA).

SUMMARY AND DESCRIPTION

The scope of the present disclosure is defined solely by the appended claims and is not affected to any degree by the statements within this description.

There exists a need to be able to create quality meshed surfaces that closely resemble an original surface being simulated as part of an FEA/FVA process.

The present embodiments may address these issues. For example, in a first aspect, a computer implemented method of remeshing patches in a triangular meshed surface is provided. An initial surface IS includes a triangular surface mesh M and a target size field TS that specifies an optimal triangle edge length at each position on the triangular surface mesh M defined over every point in M. The triangular surface mesh M is partitioned into patches. Each patch includes a contiguous set of adjacent faces delimited by closed loops of boundary or feature edges and has principal surface curvatures. The method includes a) meshing each patch using an advancing front process. The advancing front process includes: b) computing an asterisk field AF over the patch; c) initializing a front F including one or more closed chains of connected edges by the boundary or the features of the patch; and d) generating a new triangle by selecting a front edge AB from the edges of the front and determining a position of the apex C of the new triangle. The position of the apex C of the new triangle is determined by: i) calculating the radius of a first circle based on the target size at point A, $r_A=TS(A)$, calculating the radius of a second circle based on the target size at point B, $r_B=TS(B)$; ii) calculating the growth direction gd for the front edge AB from the asterisk field AF by calculating the asterisk field AF(X) at the midpoint X of the front edge AB, calculating the conjugate asterisk field CAF(X) of AF(X) as the field obtained from a 30 degree rotation of AF(x), calculating normal n as a vector orthogonal to front edge AB and aligned with the direction of the advancing font, and obtaining the growth direction gd by determining the direction of the conjugate asterisk field CAF(X) having the greatest dot product with the normal n; iii) determining the intersection $C_0$ of two circles $c_A$ centered on A with radius $r_A$ and $c_B$ centered on B with radius $r_B$ that lies in the positive half plane of the edge AB with respect to growth direction gd; iv) generating the circumcircle cc of triangle $ABC_0$; v) determining the point O of intersection between the circumcircle cc and the axis of the front edge AB; vi) constructing a line r passing through the point O with the orientation of the growth direction gd; and vii) obtaining the position of an apex C of the new triangle at the point where r intersects the circumcircle cc other than at point O. The advancing front process further includes: e) if the surface mesh M is not planar, projecting the apex C onto the initial surface IS; and f) inserting point C and enforcing the edges AC and BC into the mesh and replacing any internal triangle in the loop AB, BC, CA, with a single triangle ABC. The asterisk field AF is generated from a cross field CF aligned to the surface principal curvature directions and boundary orientation of the patch.

By generating an asterisk field AF from the cross field CF, an advancing front approach may be used to remesh a surface, where the asterisk field AF is aligned to the surface principal curvature directions and the boundary orientation of the patch in question. This leads to an increase in mesh quality when compared with prior art approaches.

In one case, neither of the contiguous front edges of front edge AB lies at an angle θ of less than 4/9π radians (80°) to front edge AB. In another case, if one of the two front edges contiguous with front edge AB, edge s, forms an angle of less than 4/9π radians (80°) with front edge AB, the first approximation of the apex C of the new triangle is the vertex of the end of edge s that is neither A nor B, and the method further includes: optimizing the position of the final apex C by taking an average of all of the apex positions C generated in the iteration of act d). Alternatively, when both of the contiguous front edges of front edge AB lie at an angle of less than $4/9\pi$ radians (80°) to the front edge AB, the front edge laying at a smallest angle to the front edge AB is selected as the edge s, and the method further includes optimizing the position of the final apex C by taking the average of all of the apex positions C generated in the iteration of act d).

The method may further include the act of: carrying out a preliminary edge check on the front edge AB including determining the length $L_{AB}$ of the front edge AB and comparing with the optimal length of the front edge AB with respect to the target size field TS, $L_{TS}$, and either if the length $L_{AB}$ is too short, the front edge AB is collapsed, or if the length $L_{AB}$ of the front edge AB is too long, the front edge AB is split.

In one embodiment, the method further includes the act of: placing all edges into a priority queue to determine the order in which new triangles are generated, and sorting the order of the edges in the priority queue. The order of the edges in the priority queue may be sorted by: determining if the angle between the edge and at least one of the contiguous edges is less than $4/9\pi$ radians (80°); determining a number of rows of triangles created while moving towards the center of the patch; and determining the iteration number of the front edge, where the iteration number of the front edge is zero.

In one embodiment, the method further includes the acts of: if the internal angles of the new triangle are measured and one of these internal angles is below a pre-determined threshold, collapsing the triangle.

In one embodiment, the generation of the asterisk field AF from the cross field CF includes the acts of: generating the cross field using the boundary and feature edge orientations of the patch as constraints and the directions of the principal surface curvature of the patch as the internal guiding field; selecting a primary axis and a secondary axis from each pair of axes of the cross field CF calculated across the patch; and designating the primary cross field CF axis as a first asterisk field AF axis direction; determining a second asterisk field AF axis direction by rotating 30° counter-clockwise from the secondary cross field CF axis; and determining a third asterisk field AF axis direction by rotating 30° clockwise from the primary cross field CF axis.

In one embodiment, if the target size TS is uniform over the triangular surface mesh M, then $r_A = r_B$.

In one embodiment, if the value of the asterisk field is zero, then apex $C = C_0$, where $C_0$ is the intersection of the two circles $c_A$ centered on A with radius $r_A$ and $c_B$ centered on B with radius $r_B$ In another aspect, the present embodiments also provide a computer-implemented method of creating a remeshed surface, where an initial surface IS includes a triangular surface mesh M and a target size field TS that specifies an optimal triangle edge length at each position on the triangular surface mesh M defined over every point in M. The computer-implemented method includes: partitioning the mesh M into patches, where each patch includes a contiguous set of adjacent faces delimited by closed loops of boundary or feature edges; remeshing each of the patches using the method above; and once all patches have been meshed, smoothing the final mesh.

In yet another aspect, the present embodiments also provide a computer program including instructions that, when the program is executed on a computer, cause the computer to carry out the acts of the method.

In yet a further aspect, the present embodiments also provide a non-transient computer program storage medium including code that, when executed on a computer, causes the computer to carry out the acts of the method.

DETAILED DESCRIPTION

Figure 1:
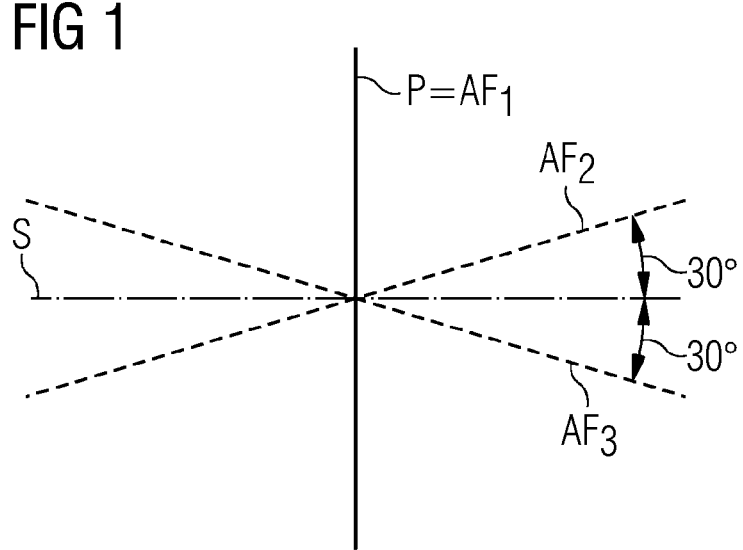
FIG. 1 is a diagrammatic illustration of derivation of an asterisk field from a cross field.

Embodiments offer advantages over the prior art as the embodiments are able to produce a high quality, uniformly sized mesh with triangles aligned to surface boundaries and curvature, thus minimizing any deviation from an original surface. In addition, the generated mesh size conforms closely to the imposed variable target size (e.g., the desired size of the edges in the mesh). This is due to the adoption of an advancing front approach for mesh generation driven by an asterisk field aligned to the surface principal curvature directions and the boundary orientation of a patch formed by partitioning the mesh. To achieve such an alignment, the present embodiments take the approach of converting a cross field into an asterisk field. This is achieved by using a computer implemented method of remeshing patches in a triangular meshed surface, where an initial surface IS includes a triangular surface mesh M and a target size field TS that specifies an optimal triangle edge length at each position on the triangular surface mesh M defined over every point in M. The triangular surface mesh M is partitioned into patches, where each patch includes a contiguous set of adjacent faces delimited by closed loops of boundary or feature edges and has principal surface curvatures. The method includes a number of acts, beginning initially with meshing each patch using an advancing front process. The advancing front process involves the computation of an asterisk field AF over the patch and then initializing a front F including one or more closed chains of connected edges by the boundary or the features of the patch. Once this has been done, new triangles are iteratively generated by selecting a front edge AB from the edges of the initial front as a basis, and the position of the apex of the new triangle C is determined using a circumcircle method. Initially, the radius of a first circle based on the target size at point A, $r_A = TS(A)$ is calculated, and the radius of a second circle based on the target size at point B, $r_B = TS(B)$ is calculated. A growth direction gd is then calculated for the front edge AB from the asterisk field AF. This is done by calculating the asterisk field AF(X) at the midpoint X of the front edge AB, calculating the conjugate asterisk field CAF(X) of AF(X) as the field obtained from a 30 degree rotation of AF(X), and then calculating normal n as a vector orthogonal to front edge AB and aligned with the direction of the advancing font. The growth direction gd is then obtained by determining the direction of the conjugate asterisk field CAF(X) having the greatest dot product with the normal n. The intersection $C_0$ of two circles $c_A$ centered on A with radius $r_A$ and $c_B$ centered on B with radius $r_B$ that lies in the positive half plane of the edge AB with respect to growth direction gd is determined. The circumcircle cc of triangle $ABC_0$ is created, and the point O of the intersection between the circumcircle cc and the axis of the front edge AB is determined. At this point, a line r passing through the point O with the orientation of the growth direction gd is determined such that apex C of the new triangle at the point where r intersects the circumcircle cc other than at point O is found. If the surface mesh M is not planar, point C is projected onto the initial surface IS. The point C is inserted into the mesh M, and the edges AC and BC are enmeshed into the mesh M so that any internal triangle in the loop AB, BC, CA are replaced with a single triangle ABC. The key feature of this method is that the asterisk field AF is generated from a cross field CF aligned to the surface principal curvature directions and boundary orientation of the patch. It is this, in conjunction with the methodology by which the individual triangles are calculated in the remeshing process, that results in the quality of the meshes generated. The detailed embodiments described below all show such improved remeshing behaviour.

Asterisk Field Generation

As described above, the embodiments employ an asterisk field AF generated from a cross field CF. An initial surface IS including a triangular surface mesh M and a target size TS that specifies an optimal triangle edge length at each position on the triangular surface mesh M defined over every point in M is created. The triangular surface mesh M is partitioned into patches, where each patch includes a contiguous set of adjacent faces delimited by closed loops of boundary or feature edges. Each patch also has principal surface curvatures. To generate a cross field CF, a complex linear system is assembled, where the boundary or feature edges and principal surface curvatures of the patch are used to define the alignment energy for the interior of the patch domain. The cross field CF is then computed for the vertices of the patch using the smooth n-direction fields theory, where n=4, as described in "Globally Optimal Direction Fields", F. Knöppel et al, http://www.cs.cmu.edu/~kmcrane/Projects/GloballyOptimalDirectionFields/paper.pdf, and transferred to the centroid of the patch. While a cross field CF may be used to drive the advancing front of a quad mesh, the cross field CF is not suitable for triangle meshing, as the cross field CF is only able to drive the advancing front in four directions. Triangle meshing instead requires the use of an asterisk field AF, since this is able to drive the advancing front in six directions. In a perfect equilateral triangle mesh, every internal vertex is attached to six edges and six faces, hence the need for an asterisk field AF with six directions to drive the advancing front. While it is also possible to apply the "Globally Optimal Direction Fields" theory to create an asterisk field AF, this does not lead to expected results. This is because an asterisk field AF cannot be aligned to the surface principal curvature directions, as there are only two axes (e.g., four directions) and not three axes (e.g., six directions). Further, an asterisk field AF does not align well to patches having rectangular boundaries (and, in general, boundaries with 90° angles), which are the most commonly used in CAE applications. It is for these reasons that the present embodiments adopt the approach of first, computing a cross field CF, and second, converting to an asterisk field AF.

FIG. 1 is a diagrammatic illustration of the derivation of an asterisk field AF from a cross field CF. Initially, for a chosen patch, a cross field CF is generated using the boundary and feature edge orientations of the patch as constraints, and the directions of the principal surface curvatures of the patch are used as the internal guiding field. This creates a pair of orthogonal, cross field CF axes, as illustrated in FIG. 1. To create the asterisk field AF, the one of the axes from the pair of cross field CF axes calculated across the patch is selected as a primary axis P, and the other is selected as a secondary axis S. The primary axis P is designated as a first asterisk field AF axis direction $AF_1$. The second asterisk field AF axis direction $AF_2$ is determined by rotating the 30° counter-clockwise from the secondary cross field CF axis S. The third and final asterisk field AF axis direction $AF_3$ is then determined by rotating 30° from the secondary cross field CF axis S. For curved surfaces, the minimum absolute curvature may be chosen as the principal direction 4; however, in some cases, it may alternatively be desirable to choose the maximum absolute curvature as the primary cross field CF axis P. For planar surfaces, where there is no curvature information, primary cross field CF axis P is imposed by the boundary orientation, and this information is propagated into the interior of the domain using a flood fill algorithm. Once the asterisk field AF has been created, the remeshing of the initial surface IS may begin by generating new triangles to replace those in the triangular meshed surface M.

Triangle Generation

Figure 2A:
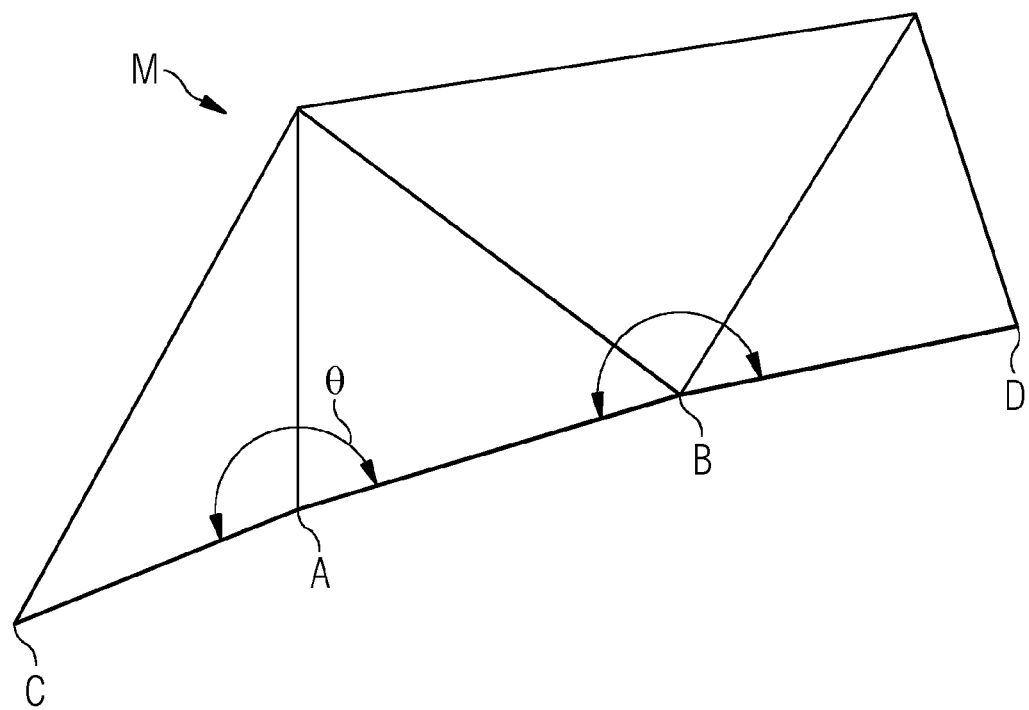
FIG. 2a is a diagrammatic illustration of possible front edge positions in generation of a triangle within a mesh when neither angle ABD nor CAB are less than $4\pi/9$ radians (80°)
Figure 2B:
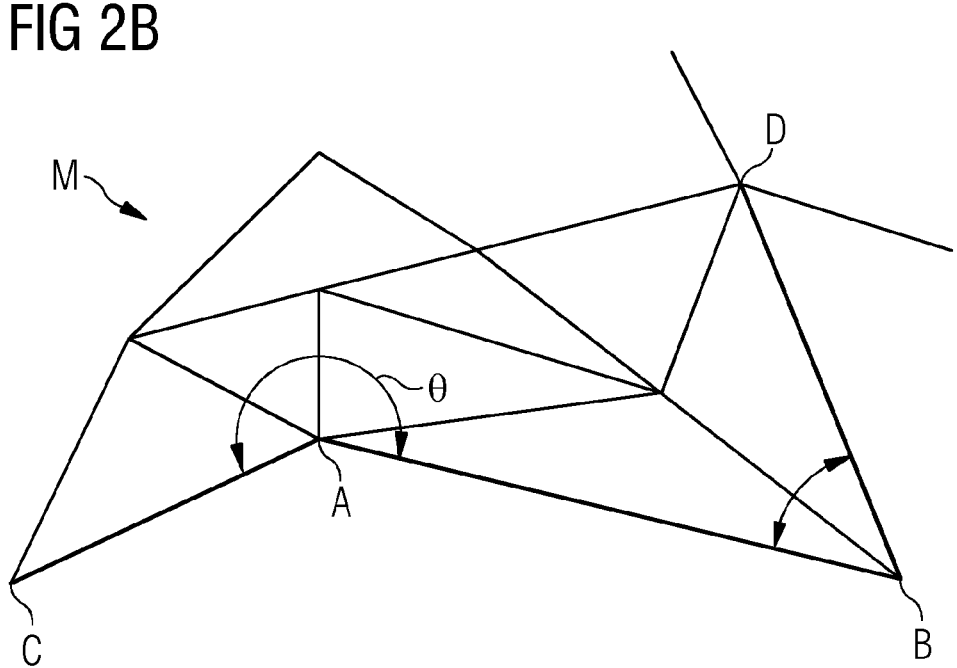
FIG. 2b is a diagrammatic illustration of possible front edge positions in the generation of a triangle within a mesh when one of angle ABD or CAB is less than $4\pi/9$ radians (80°)
Figure 2C:
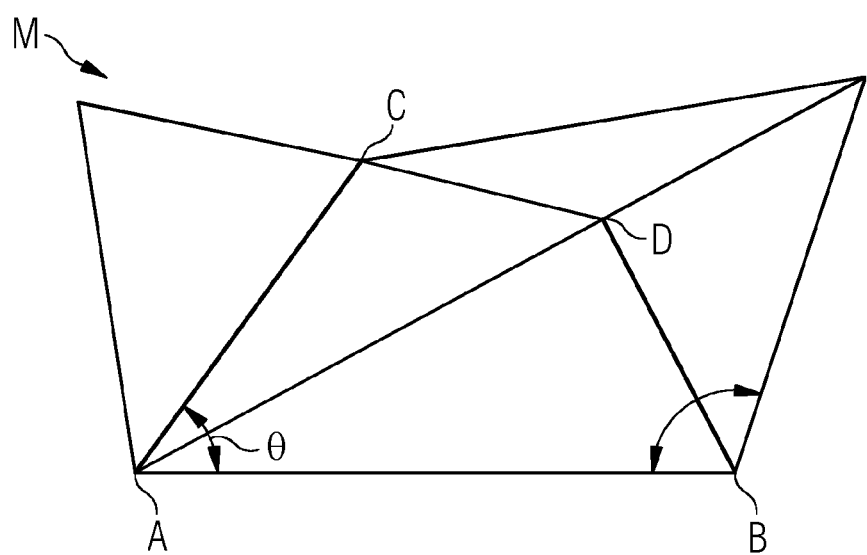
FIG. 2c is a diagrammatic illustration of possible front edge positions in the generation of a triangle within a mesh when both angle ABD and CAB are less than $4\pi/9$ radians (80°)

In triangular mesh generation, each time the front edge is processed, the mesh is modified by building a new triangle that has the front edge as one of its edges. This is illustrated further in FIG. 2. FIG. 2 is a diagrammatic illustration of possible front edge positions in the generation of a triangle within a triangular surface mesh M. The front edge is denoted as AB, with the previous edge in the loop denoted as CA and the next edge in the loop denoted BD. This illustrates that a front F includes one of more closed chains of connected edges by the boundary or the features of the patch. Depending on angles between the leading edge AB and its two contiguous edges BD and CA, there are three possible cases: i) Status 0: Neither angle ABD nor angle CAB is less than $4\pi/9$ radians)(80° (shown in FIG. 2a); ii) Status 1: The angle ABD is less than $4\pi/9$ radians (80°), the angle CAB is greater than $4\pi/9$ radians (80°), or vice versa (shown in FIG. 2b); iii) Status 2: the angles ABD and CAB are both less than $4\pi/9$ radians)(80° (shown in FIG. 2c).

The angle θ that the contiguous edges make with the leading edge AB is key in determining the complexity of the calculation of the position C of the apex of the new triangle to be generated by the advancing front. These are outlined below.

Status 0

Figure 3:
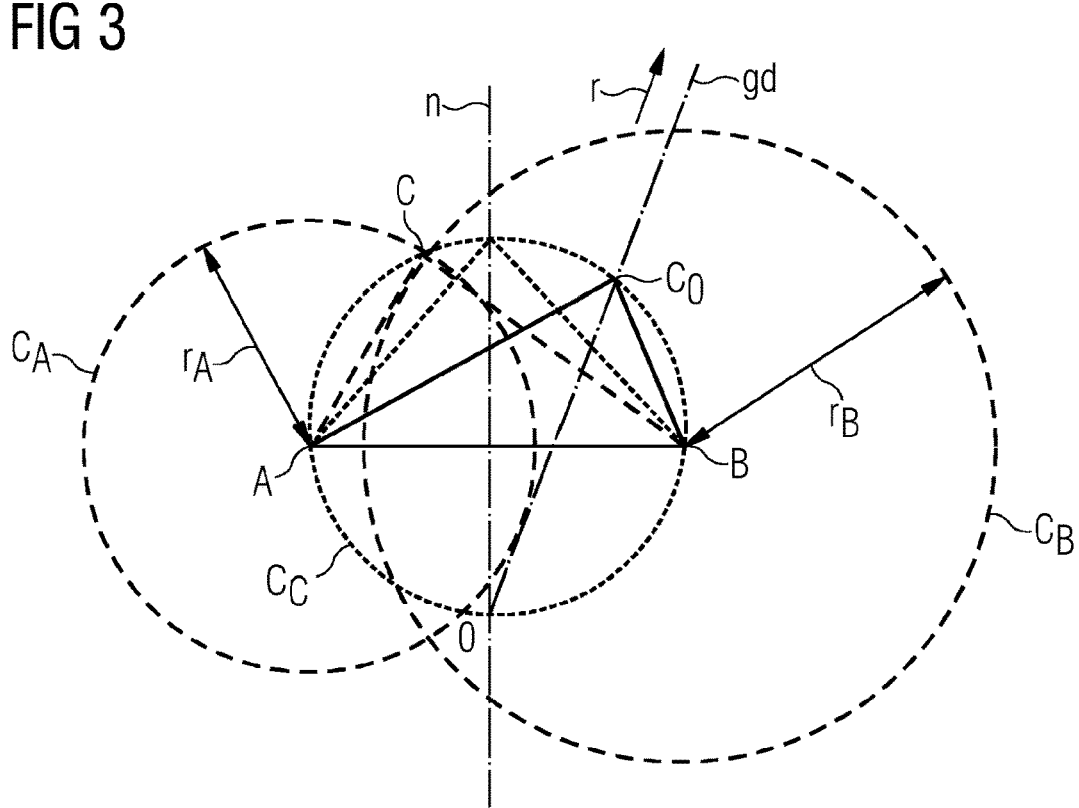
FIG. 3 is a diagrammatic illustration of an apex position during the process of generating a triangle in accordance with embodiments of the present embodiments having Status 0.

FIG. 3 is a diagrammatic illustration of apex position during the process of generating a triangle in accordance with embodiments. When neither of the contiguous front edges of front edge AB lies at an angle θ of less than $4/9\pi$ radians (80°) to front edge AB, the position of apex of the new triangle C is determined by the following acts. 1. calculating the radius of a first circle based on the target size at point A, $r_A$=TS(A), calculating the radius of a second circle based on the target size at point B, $r_B$=TS(B); 2) calculating the growth direction gd for the front edge AB from the asterisk field AF by calculating the asterisk field AF(X) at the midpoint X of the front edge AB, calculating the conjugate asterisk field CAF(X) of AF(X) as the field obtained from a 30 degree rotation of AF(x), calculating normal n as a vector orthogonal to front edge AB and aligned with the direction of the advancing font, obtaining the growth direction gd by determining the direction of the conjugate asterisk field CAF(X) having the greatest dot product with the normal n; 3) determining the intersection $C_0$ of two circles $c_A$ centered on A with radius $r_A$ and $c_B$ centered on B with radius $r_B$ that lies in the positive half plane of the edge AB with respect to growth direction gd; 4) generating the circumcircle cc of triangle $ABC_0$; 5) determining the point O of intersection between the circumcircle cc and the axis of the front edge AB; 6) constructing a line r passing through the point O with the orientation of the growth direction gd; 7) obtaining the apex C of the new triangle at the point where r intersects the circumcircle cc other than at point O; 8) if the surface mesh M is not planar, projecting point C onto the initial surface IS; and 9) inserting point C and enforcing the edges AC and BC into the mesh and replacing any internal triangle in the loop AB, BC, CA, with a single triangle ABC.

Status 1

In the case of Status 1, only one of the contiguous front edges of front edge AB lies at an angle θ of less than 4/9π radians (80°) to front edge AB. This edge is nominated as the edge s that will be used to calculate the apex of the new triangle. Since there are already two edges (e.g., the leading edge AB and the edge s) that are suitable for forming a new triangle, the vertex of this new triangle C is given by the vertex of the end of edge s that is neither A nor B. Once chosen, the apex position C is optimized by calculating the average position of all apex locations constructed for the triangles attached to C that have been generated during act d) above.

Status 2

When both of the contiguous front edges of front edge AB lie at an angle of less than 4/9π radians (80°) to the front edge AB, the front edge laying at the smallest angle to front edge AB is selected as the edge s, and the position of the apex C is generated and optimized as in Status 1.

Figure 4:
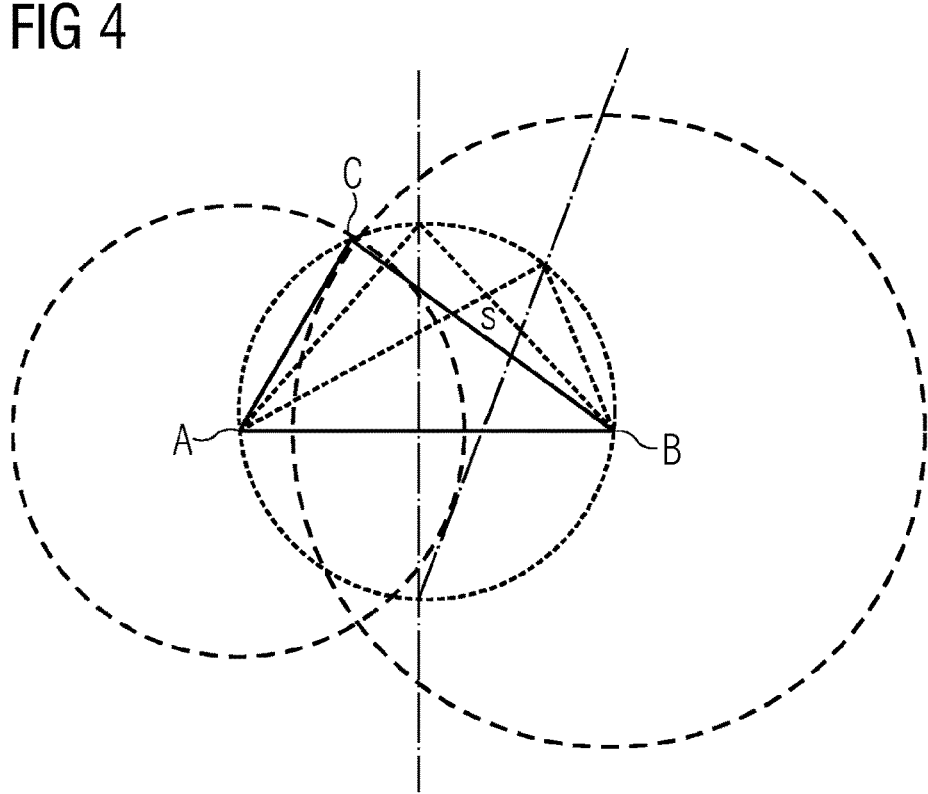
FIG. 4a illustrates an example leading edge AB and triangle apex C.
FIG. 4b illustrates the position of a new triangle apex, C'.

In the above examples, the threshold chosen to determine whether a front edge is 4/9π radians, or 80°. However, other angles may be suitable or desirable, and may fall into the range of being less than π/2 radians, or 90°. The reasoning for this is as follows. The simplest example to consider is that shown in FIGS. 4a and 4b. FIG. 4a illustrates an example leading edge AB and triangle apex C, and FIG. 4b illustrates the position of a new triangle apex, C In FIG. 4a, α represents the angle ABC, with the values of α determining whether the side edge BC is the most appropriate edge to use for a new triangle or whether it is better to discard the side edge BC. If the side edge BC is suitable, A will be connected with C, creating a triangle ABC. However, if not, a new edge BC' will be created with an angle of α/2, resulting in a triangle ABC' on the first iteration; on the next iteration a triangle BCC', also with an angle of α/2, will be created.

An ideal triangle (e.g., an equilateral triangle) has an internal angle of π/3 radians, or 60°. Therefore, to choose between the two possibilities in FIGS. 4a and 4b, the difference between the internal angle on the vertex B of the generated triangle and π/3(60°) may be minimized. The difference between these two values in the case of FIG. 4a is given by:

$$d(\alpha)=|\alpha-\pi/3| \quad (1)$$

while in the case of FIG. 4b, the difference is given by:

$$d'(\alpha)=|\alpha/2-\pi/3| \quad (2)$$

In order to choose the simplest case to generate triangle ABC (FIG. 4a)

$$d(\alpha)<d'(\alpha) \quad (3)$$

In order to solve these equations for a, (1) and (2) are substituted into (3) to give:

$$|\alpha-\pi/3|<|\alpha/2-\pi/3| \quad (4)$$

For π/3<α<2π/3

$$\alpha-\pi/3<\pi/3-\alpha/2 \quad (5)$$

leading to:

$$\alpha<4\pi/9=80°$$

While the above considers the effect of the angle θ on the generation of the triangle, the effect of the target size TS of the patch on the triangle generated is also to be considered. The target size TS may be uniform over the triangular surface mesh M, resulting in the values of $r_A$ and $r_B$ being equal and the intersection $C_0$ of circles $c_A$, $c_B$ forming an equilateral triangle $ABC_0$. If the target size TS is variable, the method continues as above with individual values of $r_A$ and $r_B$. Similarly, if there is no imposed asterisk filed AF such that the value of the asterisk field AF is zero, the apex $C=C_0$ where $C_0$ is the intersection of the two circles: $c_A$ centered on A with radius $r_A$, and $c_B$ centered on B with radius $r_B$.

In use, it may be desirable to perform further operations as part of the method of the present embodiments. For example, before beginning any calculations, it may be desirable to carry out a preliminary edge check on the front edge AB. This includes determining the length $L_{AB}$ of the front edge AB and comparing with the optimal length of the front edge AB with respect to the target size field TS, $L_{TS}$. If the length $L_{AB}$ is too short, the front edge AB is collapsed, and if the length $L_{AB}$ of the front edge AB is too long, the front edge AB is split. It may also be necessary or desirable to consider the internal angles of the new triangle in the triangular surface mesh M that has been generated. If the internal angles of the new triangle are measured and one of the internal angles is below a pre-determined threshold, the triangle is collapsed. This prevents the generation of triangles where the quality of the resulting remeshed surface is compromised. Both of these acts may be combined or alternated with an act that determines the priority in which leading edges will be processed by the advancing front. For example, all the edges of the front F are placed into a priority queue to determine the order in which the new triangles are generated. The order of the edges in the priority queue is given by looking at various criteria. First, the status: a determination of whether the angle between the edge and at least one of is contiguous edges is less than 4/9π radians (80°). A higher status has a higher priority, such that Status 2 takes priority over Status 1, which takes priority over Status 0. Second, the level: the number of rows of triangles created while moving towards the center of the patch is calculated. Third, the age of the front edge: an integer value that specifies the iteration in which the front edge was created, where initial edges have an age equal to zero. Other methods of determining the priority of the edges may be used in place of these, if desired.

The method outlined above finds particular use in computer implemented methods of creating a meshed surface. This is where the initial surface IS includes a triangular surface mesh M and a target size field TS that specifies an optimal triangle edge length at each position on the triangular surface mesh M defined over every point in M. To begin with, the method includes partitioning the mesh M into patches, where each patch includes a contiguous set of adjacent faces delimited by closed loops of boundary or feature edges before remeshing each of the patches using the method outlined in the embodiments described above iteratively. Then, once all patches have been remeshed, an act smoothing the final mesh using known techniques may be applied. To enable this, both a computer program including instructions that, when the program is executed on a computer, causes the computer to carry out the acts of the methods, or a non-transient computer program storage medium (e.g., a non-transitory computer-readable storage medium) including code that when executed on a computer causes the computer to carry out the steps of the methods may be provided.

While the present disclosure has been described in detail with reference to certain embodiments, the present disclosure is not limited to those embodiments. In view of the present disclosure, many modifications and variations would present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method of remeshing patches in a triangular meshed surface, the method being computer-implemented, wherein an initial surface comprises a triangular surface mesh and a target size field that specifies an optimal triangle edge length at each position on the triangular surface mesh defined over every point in the triangular surface mesh, the triangular surface mesh being partitioned into patches, wherein each of the patches comprises a contiguous set of adjacent faces delimited by closed loops of boundary or feature edges and has principal surface curvatures, the method comprising:

meshing each of the patches using an advancing front process, wherein the advancing front process comprises:
computing an asterisk field over the respective patch;
initializing a front comprising one or more closed chains of connected edges by the boundary or the feature edges of the respective patch;
generating a new triangle, the generating of the new triangle comprising selecting a front edge AB from the edges of the front and determining a position of an apex C of the new triangle, the determining of the position of the apex comprising:
calculating a radius of a first circle based on the target size at point A, $r_A=TS(A)$, and calculating a radius of a second circle based on the target size at point B, $r_B=TS(B)$;
calculating a growth direction for the front edge AB from the asterisk field, the calculating of the growth direction for the front edge AB from the asterisk field comprising calculating an asterisk field AF(X) at a midpoint X of the front edge AB, calculating a conjugate asterisk field CAF(X) of AF(X) as a field obtained from a 30 degree rotation of AF(X), calculating normal n as a vector orthogonal to the front edge AB and aligned with a direction of an advancing front, and determining the direction of the conjugate asterisk field CAF(X) having a greatest dot product with the normal n, such that the growth direction is obtained;
determining an intersection $C_0$ of the first circle CA centered on the point A with radius $r_A$ and the second circle CB centered on the point B with radius $r_B$ that lies in a positive half plane of the front edge AB with respect to the growth direction;
generating a circumcircle of a triangle formed by the point A, the point B, and the intersection $C_0$;
determining a point O of intersection between the circumcircle and an axis of the front edge AB;
constructing a line r passing through the point O with an orientation of the growth direction; and
obtaining the position of the apex C of the new triangle at the point where the line r intersects the circumcircle other than at the point O;
when the surface mesh M is not planar, projecting the apex C onto the initial surface; and
inserting the apex C and enforcing an edge formed by the point A and the apex C and an edge formed by the point B and the apex C into the mesh and replacing any internal triangle in a loop AB, BC, CA, with a single triangle ABC,
wherein the asterisk field is generated from a cross field aligned to surface principal curvature directions and boundary orientation of the respective patch.

2. The method of claim 1, wherein neither of contiguous front edges of the front edge AB lies at an angle of less than $4/9\pi$ radians to the front edge AB.

3. The method of claim 1, wherein when one of the two front edges contiguous with the front edge AB, edge s, forms an angle of less than $4/9\pi$ radians with the front edge AB, the apex C of the new triangle is a vertex of an end of the edge s that is neither the point A nor the point B, and the method further comprises:
optimizing the position of a final apex, the optimizing comprising taking an average of respective apex positions of each triangle generated in the generating of the new triangle.

4. The method of claim 3, wherein when both of the contiguous front edges of front edge AB lie at an angle of less than $4/9\pi$ radians to the front edge AB, the front edge laying at a smallest angle to the front edge AB is selected as the edge s, and the method further comprises:
optimizing the position of the final apex by taking an average of respective apex positions of each triangle generated in the generating of the new triangle.

5. The method of claim 1, further comprising:
carrying out a preliminary edge check on the front edge AB, the carrying out of the preliminary edge check on the front edge AB comprising:
determining a length $L_{AB}$ of the front edge AB;
comparing the determined length $L_{AB}$ with an optimal length of the front edge AB with respect to the target size field TS, $L_{TS}$;
when, based on the comparing, the length $L_{AB}$ is shorter than the optimal length, collapsing the front edge AB; and
when, based on the comparing, the length $L_{AB}$ of the front edge AB is longer than the optimal length, splitting the front edge AB.

6. The method of claim 1, further comprising:
placing all edges into a priority queue, such that an order in which new triangles are generated is determined; and
sorting the order of the edges in the priority queue, the sorting comprising:
determining if an angle between a respective edge and at least one contiguous edge is less than $4/9\pi$ radians;
determining a number of rows of triangles created while moving towards a center of the respective patch;
determining an age of the front edge comprising determining an integer value that specifies an iteration of the generating of a new triangle in which the front edge was created,
wherein initial edges have an age equal to zero.

7. The method of claim 1, further comprising:
measuring internal angles of the new triangle; and
collapsing the triangle when one of the internal angels is below a predetermined threshold.

8. The method of claim 1, wherein the generation of the asterisk field from the cross field comprises:
generating the cross field using the boundary and feature edge orientations of the respective patch as constraints and directions of the principal surface curvature of the respective patch as an internal guiding field;
selecting a primary axis and a secondary axis from each pair of axes of the cross field calculated across the respective patch;
designating the primary axis as a first asterisk field axis direction;
determining a second asterisk field axis direction, the determining of the second asterisk field axis direction comprising rotating 30° counter-clockwise from the secondary axis; and
determining a third asterisk field axis direction, the determining of the third asterisk field axis direction comprising rotating 30° clockwise from the secondary axis.

9. The method of claim 1, wherein if the target size is uniform over the triangular surface mesh M, then $r_A = r_B$.

10. The method of claim 1, wherein when a value of the asterisk field is zero, then apex $C = C_0$, where $C_0$ is the intersection of the first circle CA centered on the point A with the radius $r_A$ and the second circle CB centered on the point B with the radius $r_B$.

11. A computer-implemented method of creating a remeshed surface, wherein an initial surface comprises a triangular surface mesh and a target size field that specifies an optimal triangle edge length at each position in the triangular surface mesh defined over every point in the triangular surface mesh, the computer-implemented method comprising:
partitioning the triangular surface mesh into patches, wherein each of the patches comprises a contiguous set of adjacent faces delimited by closed loops of boundary or feature edges;
remeshing each of the patches, the remeshing comprising:
meshing each of the patches using an advancing front process, wherein the advancing front process comprises:
computing an asterisk field over the respective patch;
initializing a front comprising one or more closed chains of connected edges by the boundary or the feature edges of the respective patch;
generating a new triangle, the generating of the new triangle comprising selecting a front edge AB from the edges of the front and determining a position of an apex C of the new triangle, the determining of the position of the apex comprising:
calculating a radius of a first circle based on the target size at point A, $r_A = TS(A)$, and calculating a radius of a second circle based on the target size at point B, $r_B = TS(B)$;
calculating a growth direction for the front edge AB from the asterisk field, the calculating of the growth direction for the front edge AB from the asterisk field comprising calculating an asterisk field AF(X) at a midpoint X of the front edge AB, calculating a conjugate asterisk field CAF(X) of AF(X) as a field obtained from a 30 degree rotation of AF(X), calculating normal n as a vector orthogonal to the front edge AB and aligned with a direction of an advancing front, and determining the direction of the conjugate asterisk field CAF(X) having a greatest dot product with the normal n, such that the growth direction is obtained;
determining an intersection $C_0$ of the first circle $C_A$ centered on the point A with radius $r_A$ and the second circle $C_B$ centered on the point B with radius $r_B$ that lies in a positive half plane of the front edge AB with respect to the growth direction;
generating a circumcircle of a triangle formed by the point A, the point B, and the intersection $C_0$;
determining a point O of intersection between the circumcircle and an axis of the front edge AB;
constructing a line r passing through the point O with an orientation of the growth direction; and
obtaining the position of the apex C of the new triangle at the point where the line r intersects the circumcircle other than at the point O;
when the surface mesh M is not planar, projecting the apex C onto the initial surface; and
inserting the apex C and enforcing an edge formed by the point A and the apex C and an edge formed by the point B and the apex C into the mesh and replacing any internal triangle in a loop AB, BC, CA, with a single triangle ABC, wherein the asterisk field is generated from a cross field aligned to surface principal curvature directions and boundary orientation of the respective patch; and
once all of the patches have been meshed, smoothing the final mesh.

12. A non-transitory computer-readable storage medium that stores instructions executable by a computer to remesh patches in a triangular meshed surface, wherein an initial surface comprises a triangular surface mesh and a target size field that specifies an optimal triangle edge length at each position on the triangular surface mesh defined over every point in the triangular surface mesh, the triangular surface mesh being partitioned into patches, wherein each of the patches comprises a contiguous set of adjacent faces delimited by closed loops of boundary or feature edges and has principal surface curvatures, the instructions comprising:

meshing each of the patches using an advancing front process, wherein the advancing front process comprises:
computing an asterisk field over the respective patch;
initializing a front comprising one or more closed chains of connected edges by the boundary or the feature edges of the respective patch;
generating a new triangle, the generating of the new triangle comprising selecting a front edge AB from the edges of the front and determining a position of an apex C of the new triangle, the determining of the position of the apex comprising:
calculating a radius of a first circle based on the target size at point A, $r_A=TS(A)$, and calculating a radius of a second circle based on the target size at point B, $r_B=TS(B)$;
calculating a growth direction for the front edge AB from the asterisk field, the calculating of the growth direction for the front edge AB from the asterisk field comprising calculating an asterisk field AF(X) at a midpoint X of the front edge AB, calculating a conjugate asterisk field CAF(X) of AF (X) as a field obtained from a 30 degree rotation of AF(X), calculating normal n as a vector orthogonal to the front edge AB and aligned with a direction of an advancing front, and determining the direction of the conjugate asterisk field CAF (X) having a greatest dot product with the normal n, such that the growth direction is obtained;
determining an intersection $C_0$ of the first circle CA centered on the point A with radius $r_A$ and the second circle CB centered on the point B with radius $r_B$ that lies in a positive half plane of the front edge AB with respect to the growth direction;
generating a circumcircle of a triangle formed by the point A, the point B, and the intersection $C_0$;
determining a point O of intersection between the circumcircle and an axis of the front edge AB;
constructing a line r passing through the point O with an orientation of the growth direction; and
obtaining the position of the apex C of the new triangle at the point where the line r intersects the circumcircle other than at the point O;
when the surface mesh M is not planar, projecting the apex C onto the initial surface; and
inserting the apex C and enforcing an edge formed by the point A and the apex C and an edge formed by the point B and the apex C into the mesh and replacing any internal triangle in a loop AB, BC, CA, with a single triangle ABC, wherein the asterisk field is generated from a cross field aligned to surface principal curvature directions and boundary orientation of the respective patch.

13. The non-transitory computer-readable storage medium of claim 12, wherein neither of two contiguous front edges of the front edge AB lies at an angle of less than $4/9\pi$ radians to the front edge AB.

14. The non-transitory computer-readable storage medium of claim 12, wherein when one of the two front edges contiguous with the front edge AB, edge s, forms an angle of less than $4/9\pi$ radians with the front edge AB, the apex C of the new triangle is a vertex of an end of the edge s that is neither the point A nor the point B, and the instructions further comprise:
optimizing the position of a final apex, the optimizing comprising taking an average of all apex positions for triangles attached to the apex C generated in the generating of the new triangle.

15. The non-transitory computer-readable storage medium of claim 14, wherein when both of the contiguous front edges of the front edge AB lie at an angle of less than $4/9\pi$ radians to the front edge AB, the front edge laying at a smallest angle to the front edge AB is selected as the edge s, and the instructions further comprise:
optimizing the position of the final apex by taking an average of all of the apex positions for triangles attached to the apex C generated in the generating of the new triangle.

16. The non-transitory computer-readable storage medium of claim 12, wherein the instructions further comprise:
carrying out a preliminary edge check on the front edge AB, the carrying out of the preliminary edge check on the front edge AB comprising:
determining a length $L_{AB}$ of the front edge AB;
comparing the determined length $L_{AB}$ with an optimal length of the front edge AB with respect to the target size field TS, $L_{TS}$;
when the length $L_{AB}$ is too short, collapsing the front edge AB; and
when the length $L_{AB}$ of the front edge AB is too long, splitting the front edge AB.

17. The non-transitory computer-readable storage medium of claim 12, wherein the instructions further comprise:
placing all edges into a priority queue, such that an order in which new triangles are generated is determined; and
sorting the order of the edges in the priority queue, the sorting comprising:
determining if an angle between a respective edge and at least one contiguous edge is less than $4/9\pi$ radians;
determining a number of rows of triangles created while moving towards a center of the respective patch;
determining an age of the front edge comprising determining an integer value that specifies an iteration in which the front edge was created,
wherein initial edges have an age equal to zero.

* * * * *